US 011144098B2

United States Patent
Lim et al.

(10) Patent No.: US 11,144,098 B2
(45) Date of Patent: Oct. 12, 2021

(54) ELECTRONIC DEVICE INCLUDING STAND MEMBER

(71) Applicant: Samsung Electronics Co., Ltd., Gyeonggi-do (KR)

(72) Inventors: Chaehoon Lim, Gyeonggi-do (KR); Youngjoon Ahn, Gyeonggi-do (KR); Dusun Choi, Gyeonggi-do (KR); Yongsang Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/921,391

(22) Filed: Jul. 6, 2020

(65) Prior Publication Data

US 2020/0333832 A1  Oct. 22, 2020

Related U.S. Application Data

(63) Continuation of application No. 16/555,460, filed on Aug. 29, 2019, now Pat. No. 10,705,572.

(30) Foreign Application Priority Data

Oct. 19, 2018 (KR) .................. 10-2018-0125100

(51) Int. Cl.
*G06F 1/16* (2006.01)
*F16M 13/00* (2006.01)

(52) U.S. Cl.
CPC .......... *G06F 1/166* (2013.01); *F16M 13/005* (2013.01); *G06F 1/1626* (2013.01); *G06F 1/1681* (2013.01)

(58) Field of Classification Search
CPC combination set(s) only.
See application file for complete search history.

(56) References Cited

U.S. PATENT DOCUMENTS

| 6,016,248 A * | 1/2000 | Anzai | G06F 1/1626 361/679.59 |
| 6,034,866 A * | 3/2000 | Nobuchi | G06F 1/1626 248/298.1 |
| 7,148,874 B2 * | 12/2006 | Anzai | F16M 11/10 345/156 |

(Continued)

FOREIGN PATENT DOCUMENTS

| JP | 06-19581 | 1/1994 |
| JP | 2012-058934 | 3/2012 |

(Continued)

OTHER PUBLICATIONS

International Search Report dated Nov. 27, 2019 issued in counterpart application No. PCT/KR2019/010510, 8 pages.

(Continued)

*Primary Examiner* — Lisa Lea-Edmonds
(74) *Attorney, Agent, or Firm* — The Farrell Law Firm, P.C.

(57) ABSTRACT

An electronic device is provided, which includes a housing, at least one hinge structure disposed to the housing, and a stand member that is opened or closed at an angle from the housing through the at least one hinge structure. The housing includes an engaging stopper formed at an outer surface of the housing. The stand member includes a first stopper formed at a corresponding position of the engaging stopper. The angle is determined when the first stopper meets the engaging stopper.

20 Claims, 7 Drawing Sheets

(56) References Cited

U.S. PATENT DOCUMENTS

| | | | | |
|---|---|---|---|---|
| 7,159,771 | B2* | 1/2007 | Singgih | F16M 11/10 235/375 |
| 7,245,481 | B2* | 7/2007 | Shimizu | F16M 11/046 248/284.1 |
| 7,472,880 | B2* | 1/2009 | Ogawa | F16M 11/10 248/455 |
| 7,869,200 | B2* | 1/2011 | Horie | G06F 1/1669 361/679.02 |
| 7,898,796 | B2* | 3/2011 | Horie | G06F 1/1669 361/679.02 |
| 7,916,478 | B2* | 3/2011 | Tu | F16M 13/005 361/679.59 |
| 7,937,810 | B2* | 5/2011 | Hu | G06F 1/1601 16/241 |
| 8,081,429 | B2* | 12/2011 | Horie | G06F 1/1615 361/679.02 |
| 8,230,992 | B2* | 7/2012 | Law | G06F 1/1626 206/320 |
| 8,695,939 | B2* | 4/2014 | Lee | F16M 11/08 248/476 |
| 9,052,873 | B2* | 6/2015 | Murakata | G06F 1/1626 |
| 9,255,661 | B2* | 2/2016 | Quijano | F16M 11/2021 |
| 9,918,534 | B2* | 3/2018 | Saila | A45C 11/00 |
| 9,921,610 | B2* | 3/2018 | Lu | G06F 1/166 |
| 10,037,050 | B2* | 7/2018 | Lin | G06F 1/1656 |
| 10,139,865 | B2* | 11/2018 | Koriyama | A63F 13/98 |
| 10,627,872 | B2* | 4/2020 | Shinotou | A45C 11/00 |
| 10,677,387 | B2* | 6/2020 | Han | G06F 1/1681 |
| 10,802,548 | B2* | 10/2020 | Wu | G06F 1/1607 |
| 10,859,199 | B2* | 12/2020 | Kim | F16M 13/022 |
| 2001/0040529 | A1 | 11/2001 | Cheng et al. | |
| 2002/0180694 | A1 | 12/2002 | Isaacson | |
| 2004/0137958 | A1 | 7/2004 | Sawai | |
| 2005/0001114 | A1* | 1/2005 | Ogawa | F16M 11/10 248/127 |
| 2005/0040311 | A1* | 2/2005 | Lee | F16M 13/005 248/454 |
| 2009/0014608 | A1* | 1/2009 | Yang | F16M 13/00 248/176.3 |
| 2010/0072342 | A1* | 3/2010 | Huang | F16M 11/10 248/434 |
| 2011/0286166 | A1 | 11/2011 | Nam et al. | |
| 2012/0104194 | A1 | 5/2012 | Lee | |
| 2014/0140000 | A1* | 5/2014 | Ooe | G06F 1/1677 361/679.56 |
| 2014/0340833 | A1* | 11/2014 | Horinishi | G06F 1/166 361/679.27 |
| 2015/0257299 | A1* | 9/2015 | Su | G06F 1/1601 361/679.01 |
| 2015/0282354 | A1* | 10/2015 | Spollen | H05K 5/03 206/45.2 |
| 2016/0048173 | A1 | 2/2016 | Lyles et al. | |
| 2018/0024595 | A1 | 1/2018 | Delpier et al. | |
| 2019/0025879 | A1* | 1/2019 | Koriyama | G06F 1/1679 |
| 2019/0041907 | A1 | 2/2019 | Kim et al. | |
| 2019/0079563 | A1 | 3/2019 | Wu | |
| 2019/0129475 | A1* | 5/2019 | Lai | G06F 1/166 |

FOREIGN PATENT DOCUMENTS

| | | |
|---|---|---|
| KR | 20040060747 | 7/2004 |
| KR | 1020110127558 | 11/2011 |
| KR | 20170100749 | 9/2017 |
| WO | WO 2016/167744 | 10/2016 |

OTHER PUBLICATIONS

European Search Report dated May 31, 2021 issued in counterpart application No. 19874257.9-1203, 8 pages.

* cited by examiner

ELECTRONIC DEVICE INCLUDING STAND MEMBER

CROSS-REFERENCE TO RELATED APPLICATION(S)

This application is a continuation of U.S. Ser. No. 16/555,460, which was filed in the U.S. Patent and Trademark Office on Aug. 29, 2019, and claims priority under 35 U.S.C. § 119 to Korean Patent Application No. 10-2018-0125100, which was filed in the Korean Intellectual Property Office on Oct. 19, 2018, the entire disclosure of each of which is incorporated herein by reference.

BACKGROUND

1. Field

The disclosure relates generally to an electronic device including a stand member.

2. Description of Related Art

With the growth of electronic and communication industries, a great variety of electronic devices, such as mobile communication terminals (e.g., smart phones, and tablet personal computers (PCs)), electronic organizers, personal hybrid terminals, or laptop computers have been popularized. Many electronic devices provide a graphical user interface (GUI) environment through a touch screen in order to facilitate user accessibility and provide various multimedia content.

Electronic devices can each have an inherent device characteristic and feature in use. For example, a tablet PC often has a larger display than a smart phone, thus being better suited for providing users with multimedia content on the larger screen.

An electronic device, such as a tablet PC, may be favorable for displaying when mounted on a separate stand member (or a mounting member or a holder) at a certain angle, rather than resting flat on a horizontal surface (e.g., a table or a desk).

However, although it may improve the usability of the electronic device, such a stand member is often inconvenient because it should be carried separately from the electronic device when not in use.

In addition, although a stand member directly coupled to a rear middle portion of an electronic device, which may be opened/closed at a certain angle, has been considered, this type of integrated stand member may still cause a spacing problem in that the arrangement of internal components of the electronic device may be restricted due to the stand member.

SUMMARY

The disclosure has been made to address at least the disadvantages described above and to provide at least the advantages described below.

An aspect of the disclosure is to provide an electronic device including a stand member.

Another aspect of the disclosure is to provide an electronic device including a stand member that is coupled to the electronic device, e.g., through a hinge structure, and also allows efficient arrangement of internal components of the electronic device.

In accordance with an aspect of the disclosure, an electronic device is provided, which includes a housing; at least one hinge structure disposed to the housing; and a stand member that is opened or closed at an angle from the housing through the at least one hinge structure. The housing includes an engaging stopper formed at an outer surface of the housing. The stand member includes a first stopper formed at a corresponding position of the engaging stopper. The angle is determined when the first stopper meets the engaging stopper.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Various embodiments of the disclosure will be described in detail with reference to accompanying drawings. In the following description, specific details such as detailed configurations and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
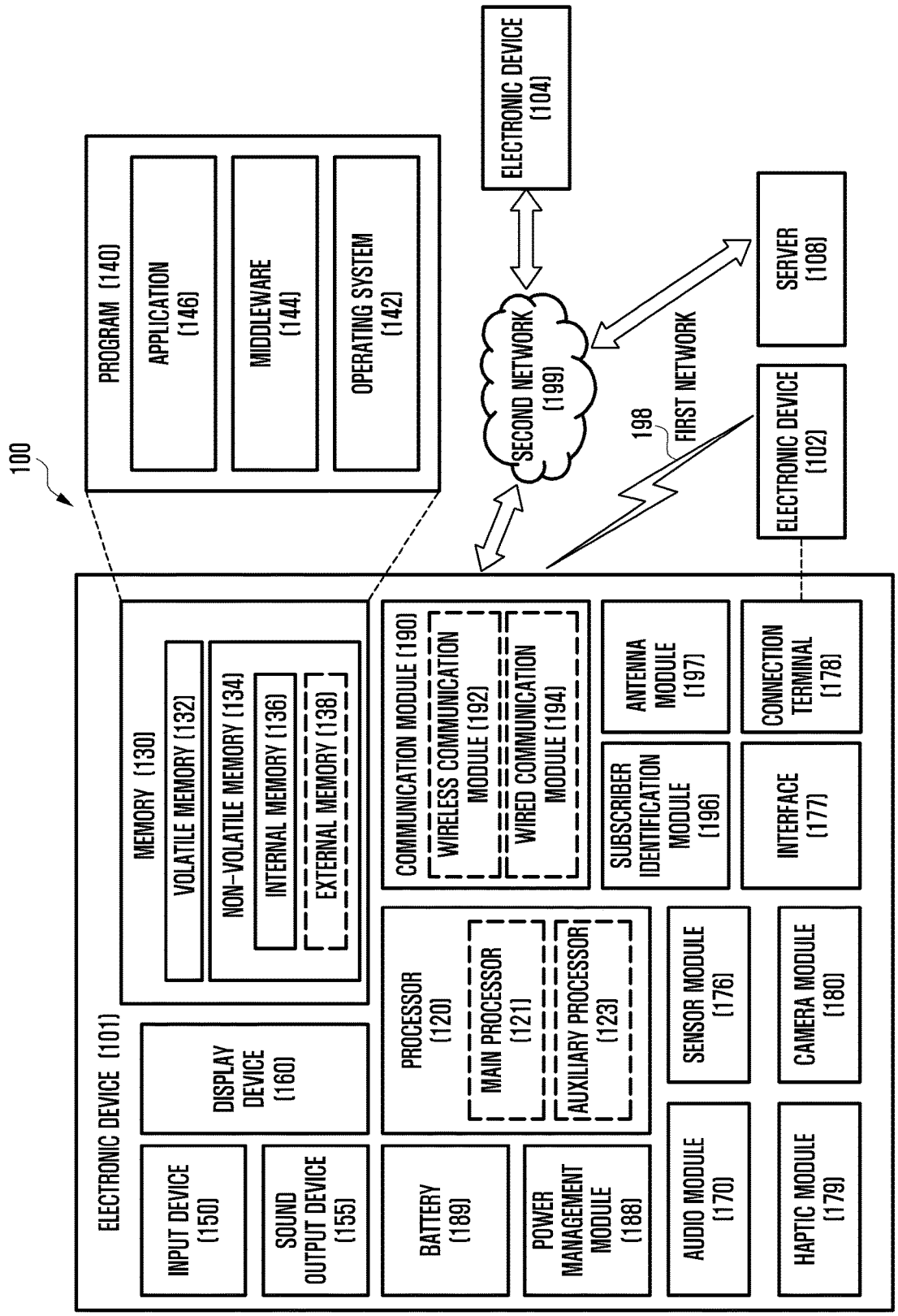
FIG. 1 illustrates an electronic device in a network environment according to an embodiment.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "$1^{st}$" and "$2^{nd}$", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
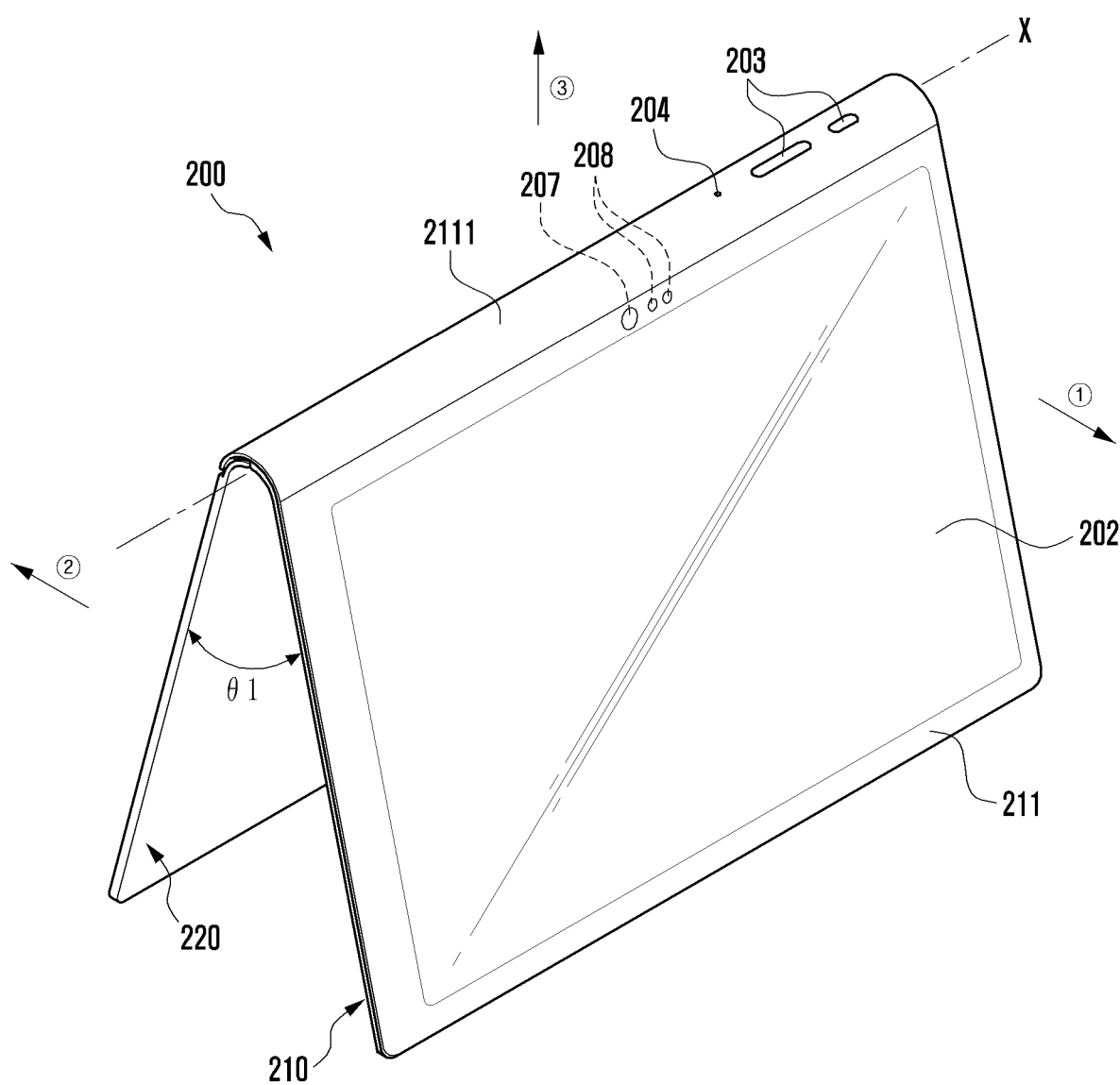
FIG. 2A illustrates an electronic device according to an embodiment.
Figure 2B:
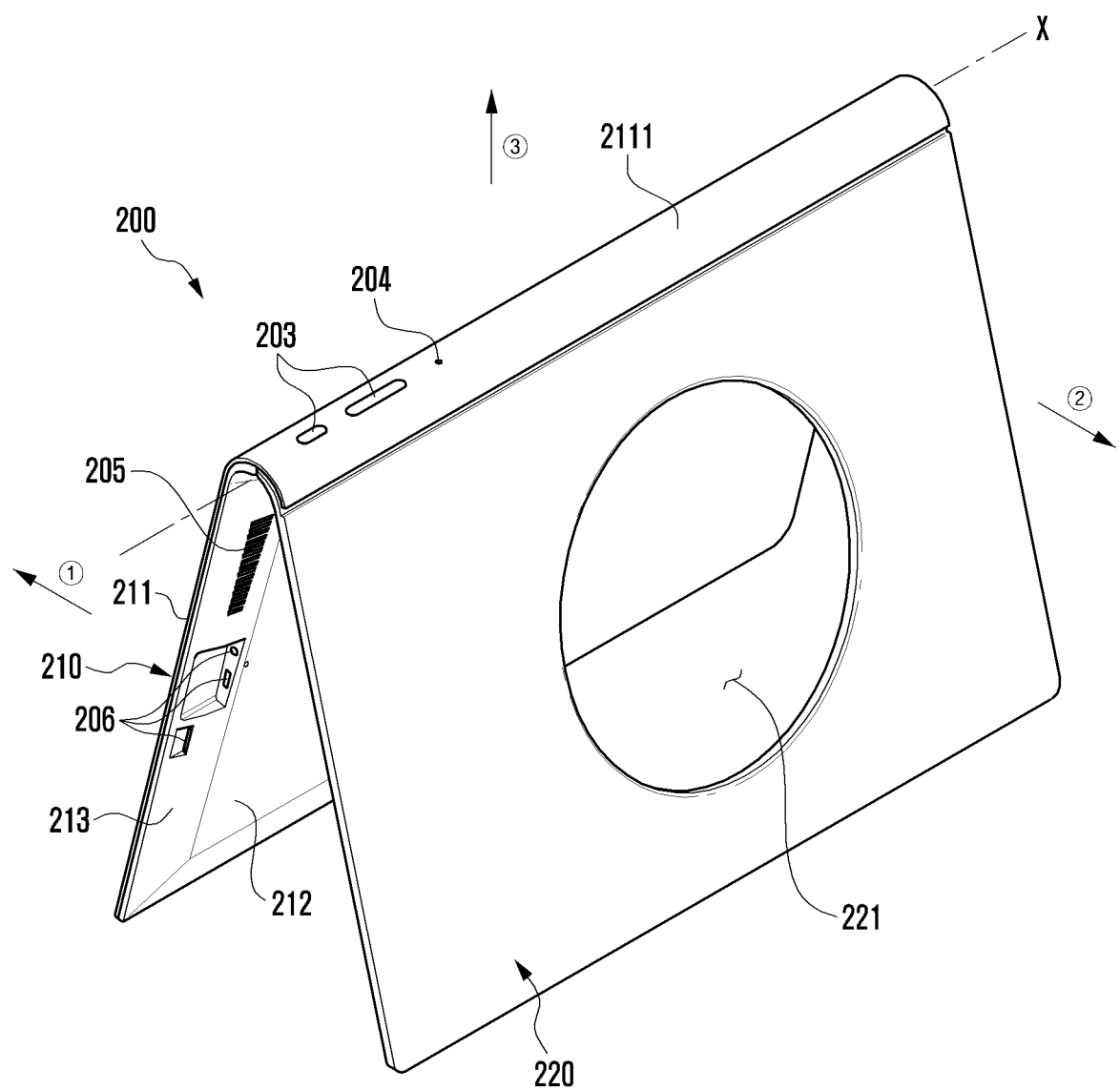
FIG. 2B illustrates the electronic device of FIG. 2A, viewed from another angle, according to an embodiment.

FIG. 2A illustrates an electronic device according to an embodiment. FIG. 2B illustrates the electronic device of FIG. 2A, viewed from another angle, according to an embodiment.

Referring to FIGS. 2A and 2B, an electronic device 200 includes a housing 210 (also referred to as a main body or a main device part) and a stand member 220 (also referred to as a mounting member or a holder). The housing 210 includes a first plate 211 (e.g., a front plate) facing in a first direction (indicated by ①), a second plate 212 (e.g., a rear plate) facing in a second direction (indicated by ②) opposite to the first direction, and a lateral member 213 surrounding a space between the first plate 211 and the second plate 212. The stand member 220 is disposed to be opened or closed at a predetermined angle (θ1) from the housing 210. The second plate 212 and the lateral member 213 may be formed of separate components or integrally formed with each other. For example, the lateral member 213 may be bent at an angle from and integrally formed with edges of the second plate 212.

The stand member 220 may be operable to have a specific opening angle (θ1) through a hinge structure disposed at the upper end of the second plate 212. The stand member 220 may be connected to the second plate 212 through at least one hinge structure disposed at the upper end of the second plate 212 to be rotatable about a rotation axis (X). The first plate 211 may include a substantially transparent glass or polymer plate. The second plate 212, the lateral member 213, and/or the stand member 220 may be formed of coated or colored glass, ceramic, polymer, metal (e.g., aluminum, stainless steel (STS), or magnesium), or a combination thereof.

The first plate 211 includes, at the upper end thereof, an extended portion 2111 that is seamlessly curved toward the stand member 220. The extended portion 2111 may be formed, at least in part, in a curvilinear shape to surround a support member where the hinge structure is disposed. The extended portion 2111 may be formed to overlap with the upper end of the stand member 220. The upper end of the stand member 220 may be formed to be partially rotated while being in a surface contact with the extended portion 2111 of the first plate 211. That is, structural shapes of the stand member 220 and the extended portion 2111 may define the specific opening angle (θ1).

The electronic device 200 includes a display 202 disposed in an internal space of the housing 210 to be visible outwardly through at least a portion of the first plate 211. The display 202 may include a flexible display and/or a touch screen display having a touch sensor. The display 202 may be disposed to be seen outwardly through the substantially entire area of the first plate 211.

The electronic device 200 includes at least one camera module 207 and at least one sensor module 208, which are disposed on at least a portion of the first plate 211. The at least one sensor module 208 may generate an electrical signal or data value corresponding to an internal operating state of the electronic device 200 or to an external environmental condition. The at least one sensor module 208 may include at least one of an illuminance sensor, a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, or a proximity sensor.

The electronic device 200 includes at least one speaker device 205 and at least one interface connector port 206, which are disposed on the second plate 212 and/or the lateral member 213. The at least one speaker device 205 may emit a sound, outputted from a pair of speaker modules disposed in the internal space of the electronic device 200, through the second plate 212 and/or the lateral member 213. The at least one interface connector port 206 may include a charging port to be used for charging an internal battery by receiving power from an external power source, a data transmission/reception port, an ear jack assembly, or at least one card slot to be used for accommodating a memory card or a user identification card (e.g., a SIM card).

At least some of components of the electronic device 200 may be disposed in the extended portion 2111 of the first plate 211 so as to facilitate a user's convenient manipulation and also realize the optimized operating performance. These components may include a key input device 203 exposed, at least in part, through the extended portion 2111 to assist a convenient manipulation, a microphone device 204 for collecting external sounds through the extended portion 2111, and/or at least one antenna disposed near the extended portion 2111 in the internal space of the electronic device 200 to realize radiation performance optimized in the upward direction (indicated by ③) and/or the backward direction (indicated by ②) of the electronic device 200. The key input device 203 may include a power ON/OFF button, a volume UP/DOWN button, or a mode change button. The microphone device 204 may include a directional microphone device and/or an omnidirectional microphone device.

The stand member 220 may be disposed to be rotatable about a rotation axis (X) near the extended portion 2111 formed in a curvilinear shape. When the stand member 220 is completely opened from the housing 210 at the specific opening angle (θ1), the electronic device 200 can be erected upright on a flat surface, such as a tabletop, through both the lower end of the housing 210 and the lower end of the stand member 220. The stand member 220 includes a handle opening 221 formed therein to assist an easy carry of the electronic device 200 in a closed (i.e., folded) state to be in contact with the housing 210. The handle opening 221 may be formed in a circular shape or in any other shape such as a rectangular shape or a polygonal shape. Two or more handle openings may be formed. Additionally, at least one opening for securing to a wall surface or the like may be formed.

Figure 3:
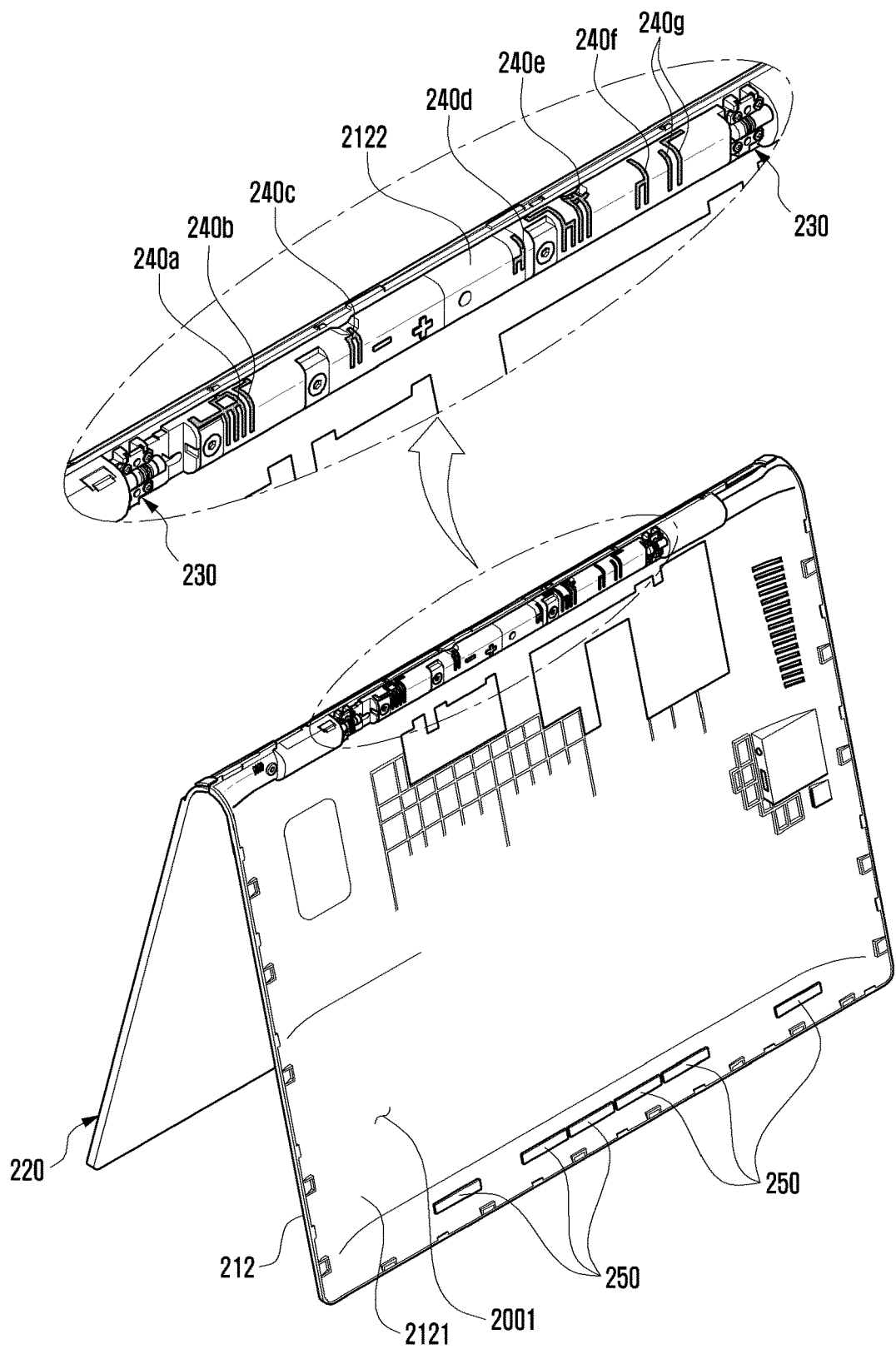
FIG. 3 illustrates a second plate viewed in an internal space of an electronic device according to an embodiment.

FIG. 3 illustrates a second plate viewed in an internal space of an electronic device according to an embodiment.

Referring to FIG. 3, the electronic device 200 includes a support member 2122 disposed to accommodate a hinge structure 230 on the upper end of the inner surface of the second plate 212 in the internal space 2001 of the housing 210. The support member 2122 may extend widthwise at the upper end of the second plate 212. The support member 2122 may be formed integrally with the second plate 212. Alternatively, the support member 2122 may be disposed separately from the second plate 212. The hinge structure 230 may be disposed through the support member 2122 and also assembled with the stand member 220. The hinge structure 230 allows the stand member 220 to pivot at a predetermined angle (e.g., specific opening angle (θ1) in FIG. 2A) on the support member 2122 from the second plate 212.

The electronic device 200 includes antennas 240a, 240b, 240c, 240d, 240e, 240f, and 240g disposed in the support member 2122. In this case, the support member 2122 may act as an antenna carrier of an insulating material. The antennas 240a, 240b, 240c, 240d, 240e, 240f, and 240g may have a laser direct structuring (LDS) pattern disposed in the support member 2122. Alternatively, the antennas 240a, 240b, 240c, 240d, 240e, 240f, and 240g may include a flexible printed circuit board (FPCB) having a conductive pattern attached to the support member 2122. The antennas 240a, 240b, 240c, 240d, 240e, 240f, and 240g may be disposed to form the radiation coverage in the upward direction (indicated by ③ in FIG. 2A) and/or the backward direction (indicated by ② in FIG. 2A) of the electronic device 200 through the extended portion (e.g., 2111 in FIG. 2A) of the first plate 211. The antennas 240a, 240b, 240c, 240d, 240e, 240f, and 240g disposed at the upper part of the electronic device 200 near the hinge structures 230 are more advantageous for reducing a specific absorption rate (SAR) than an antenna disposed at any other position of the electronic device 200. In addition, such an antenna disposition is spaced apart from a portion where the user holds the electronic device 200, thus preventing deterioration in radiation performance.

The electronic device 200 includes at least one magnet 250 disposed within the second plate 212 to physically maintain the stand member 220 in a closed (i.e., folded) state with the housing 210. The at least one magnet 250 may be disposed generally near the lower end of the second plate 212 in the internal space 2001 of the electronic device 200. A metal member that reacts to the magnetic force of the magnet 250 may be disposed at a corresponding position of the stand member 220. Alternatively, the magnet 250 may be disposed in the stand member 220, and the metal member 225 may be disposed on the inner surface 2121 of the second plate 212.

Figure 4:
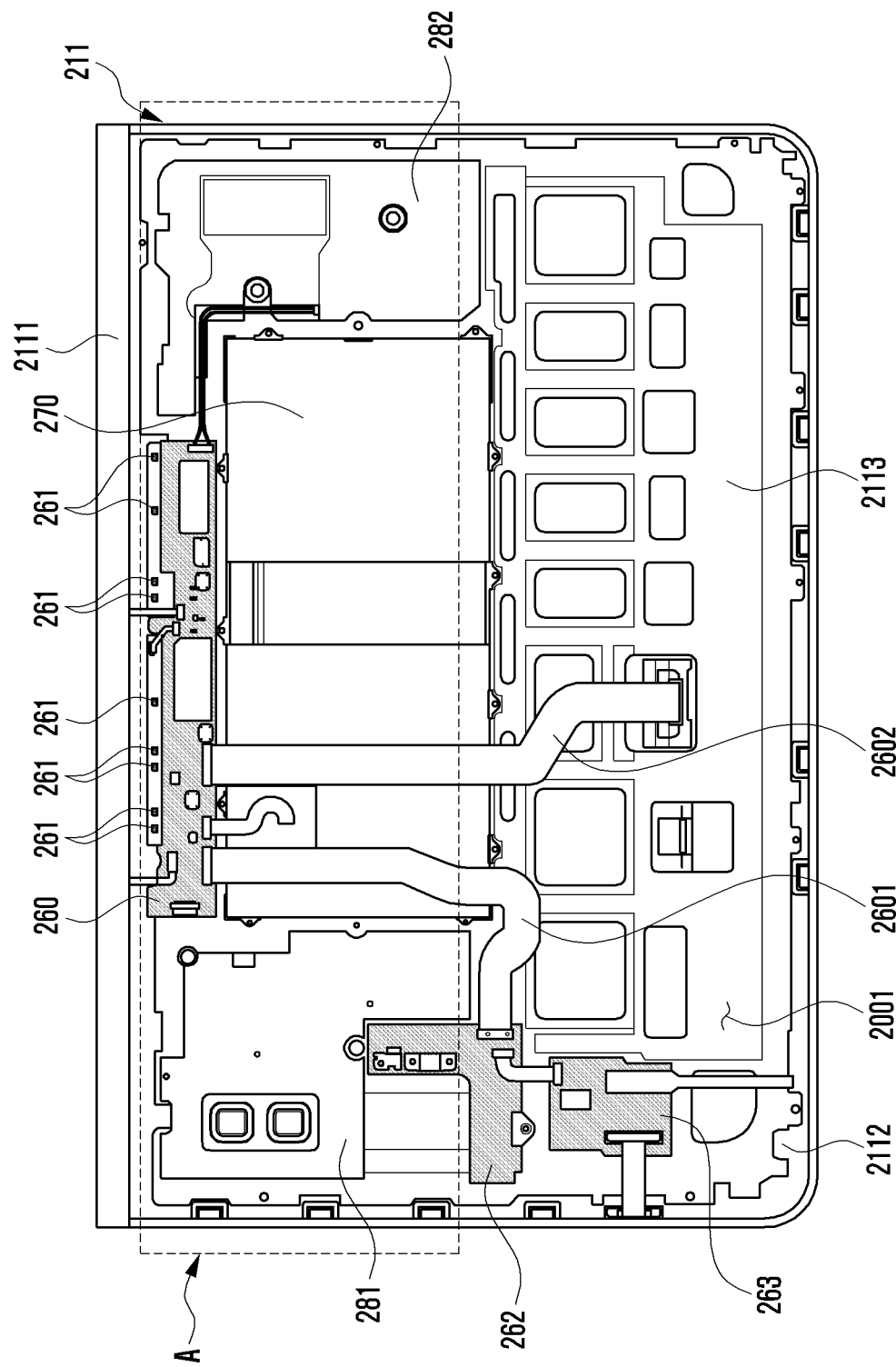
FIG. 4 illustrates a first plate viewed in an internal space of an electronic device according to an embodiment.

FIG. 4 illustrates a first plate viewed in an internal space of an electronic device according to an embodiment.

Referring to FIG. 4, the electronic device 200 includes a reinforcing member 2113 disposed in the internal space 2001 of the housing 210 and being similar in area to the inner surface 2112 of the first plate 211. The reinforcing member 2113 may be disposed on the inner surface 2112 of the first plate 211 such that a display is interposed between the first plate 211 and the reinforcing member 2113. The reinforcing member 2113 may be formed of a metal material in the form of a plate. The reinforcing member 2113 may increase the mechanical rigidity of the electronic device 200 and also operate as ground by being electrically connected to electronic components disposed in the internal space 2001.

The electronic device 200 may include a variety of electronic components disposed on the reinforcing member 2113, such as a PCB 260, a battery 270, at least one speaker module 281 and 282, at least one sub-board 262 and 263, or at least one conductive connector 2601 and 2602 (e.g., FPCB) that electrically connects the PCB 260 and the at least one sub-board 262 and 263. Because the hinge structure is disposed at the upper end of the electronic device 200 as described above, the housing may be formed to have a downwardly tapered shape, that is, a gradually decreasing thickness from top to bottom. Therefore, most of the above-mentioned electronic components may be disposed through an upper region (indicated by 'A') of the first plate 211 in the internal space 2001 of the electronic device 200.

The electronic device 200 may include the PCB 260 disposed on the inner surface 2112 of the first plate 211 near the extended portion 2111. The PCB 260 includes at least one conductive contact 261. The conductive contact 261 may be disposed at a position corresponding to the support member disposed in the second plate. The conductive contact 261 may be electrically connected to the antenna by assembling the first and second plates 211 and 212 with each other. The conductive contact 261 may include a conductive clip (e.g., a C-clip) mounted on the PCB 260.

The electronic device 200 may include the battery 270 disposed near the PCB 260. In a plan view of the first plate 211, the battery 270 may be at least partially overlapped with the PCB 260 or alternatively disposed at a side-by-side position without overlap.

The electronic device 200 may include the pair of speaker modules 281 and 282 disposed on the left and right sides of the battery 270, respectively. The electronic device 200 includes the first sub-board 262 and the second sub-board 263 sequentially disposed on the lower side of the speaker module 281. The first sub-board 262 may have an interface connector port of the electronic device 200. The second sub-board 263 may have a card slot of the electronic device 200. Alternatively, the first sub-board 262 and/or the second sub-board 263 may have an ear jack assembly. The electrical connectors 2601 and 2602 may be disposed to electrically connect the PCB 260 and other electronic components.

Figure 5A:
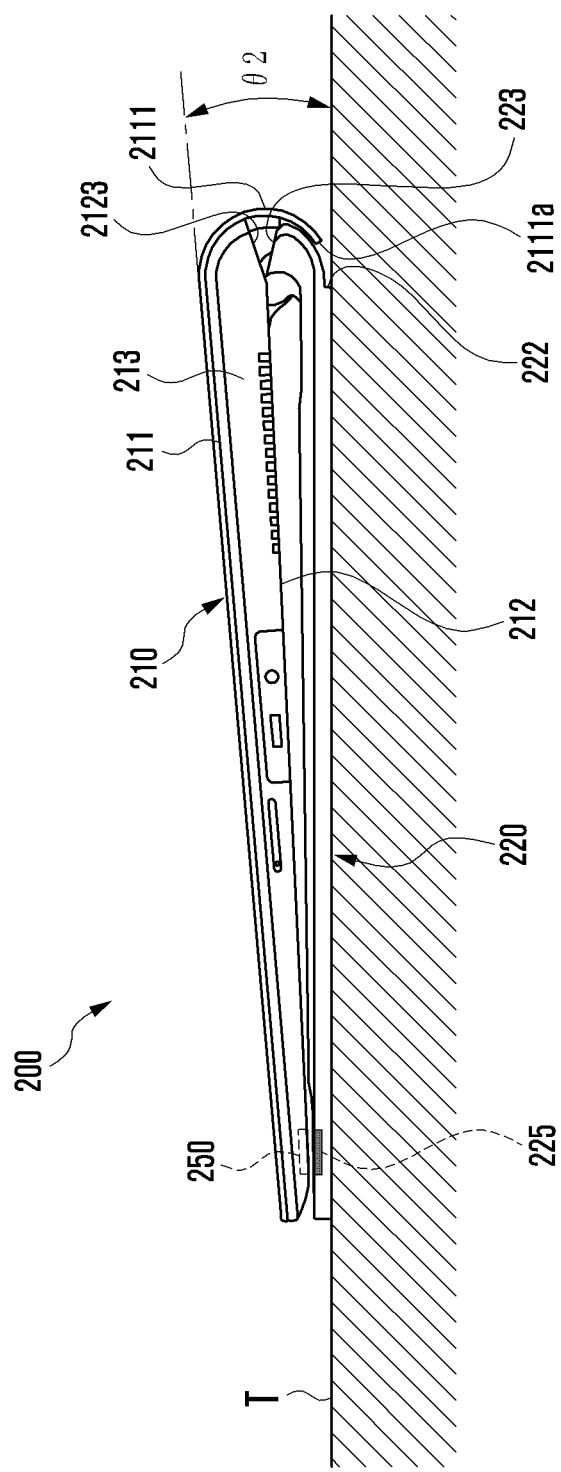
FIG. 5A illustrates a side view of an electronic device laid on a table according to an embodiment.
Figure 5B:
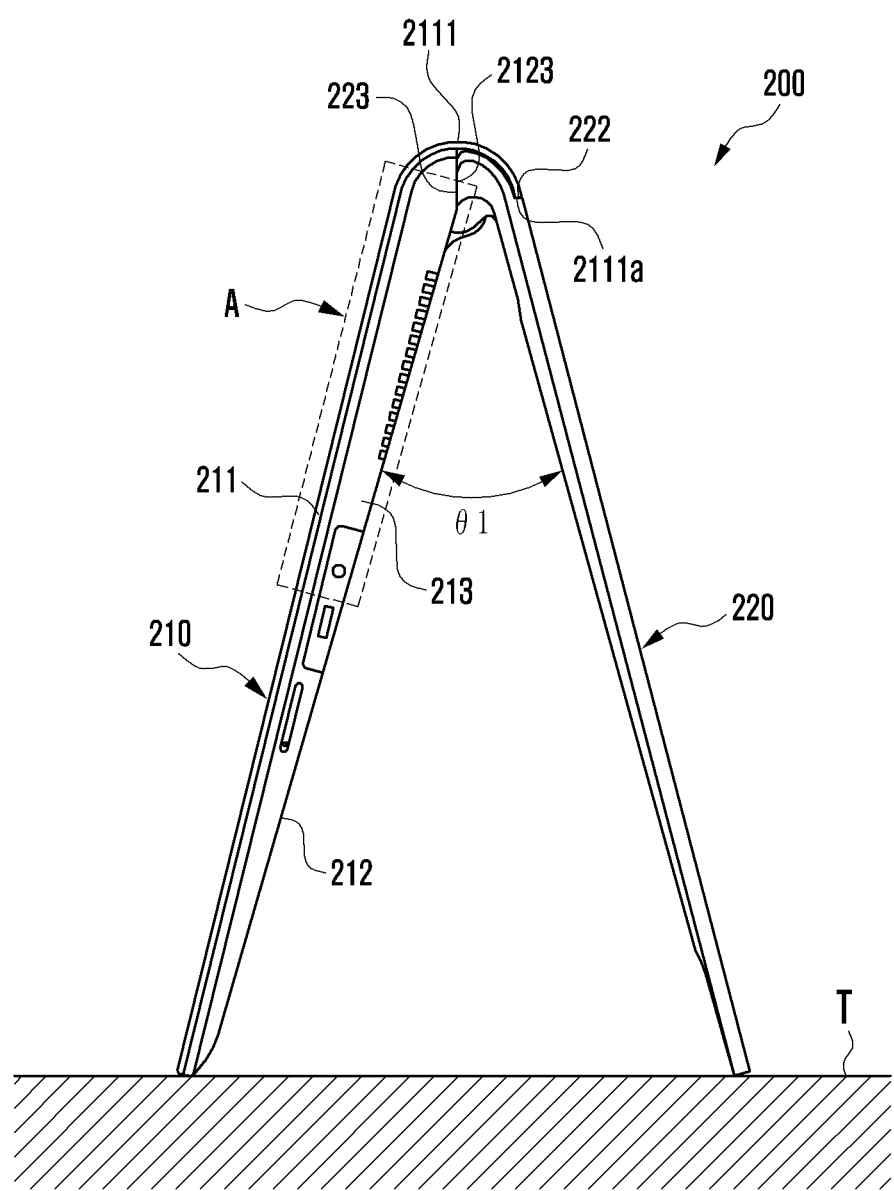
FIG. 5B illustrates a side view of an electronic device erected at an angle on a table via a stand member according to an embodiment.

FIG. 5A illustrates a side view of an electronic device laid on a table, according to an embodiment. FIG. 5B illustrates a side view of an electronic device erected at an angle on a table via a stand member according to an embodiment.

Referring to FIG. 5A, the electronic device 200 may be formed to have a thickness that increases from the lower end of the housing 210 toward the upper end including the extended portion 2111. Therefore, when the electronic device 200 is laid on the table (T) with the stand member 220 and the housing 210 completely folded, the display is tilted toward the user at a certain angle (θ2). This improves convenience in use of the electronic device 200. In this case, the metal member 225 disposed in the stand member 220 is influenced by the magnetic force of the magnet 250 disposed in the housing 210. Thus, the stand member 220 is prevented from being spread out from the housing 210.

The electronic device 200 may include a structure for defining the opening angle (θ1) of the stand member 220. The extended portion 2111 may be disposed to enclose at least the upper end of the stand member 220 and rotated while being in surface contact with the stand member 220. The stand member 220 may include, at an outer upper portion thereof, a second stopper 222 (e.g., a recess) formed to be stepped lower than a peripheral region. When the stand member 220 is opened up to the opening angle (θ1), the rotation of the extended portion 2111 of the first plate 211 is stopped by contact between the second stopper 222 and a tip 2111a of the extended portion 2111. The length of the extended portion 2111 and/or the position of the second stopper 222 may be selected to define the opening angle (θ1) of the stand member 220. Without any additional stopping structure, the opening operation of the stand member 220 may be restricted through a self-stopping structure formed by both the extended portion 2111 of the first plate 211 and the second stopper 222 of the stand member 220. The electronic device 200 may further have another self-stopping structure formed near the hinge structure by a first stopper 223 of the stand member 220 and an engaging stopper 2123 of the second plate 212. In this case, the first stopper 223 is a terminating plane of the stand member 220, and the engaging stopper 2123 is a terminating plane of the second plate 212.

Referring to FIG. 5B, when the stand member 220 is completely opened the opening angle (θ1) from the housing 210, the electronic device 200 may be erected on the table (T). In this case, the extended portion 2111 of the first plate 211 moves along, while being overlapped with, the outer upper portion of the stand member 220 and is then stopped by the second stopper 222 of the stand member 220. An angle between the housing 210 and the stand member 220 reaches the predetermined opening angle (θ1). In addition, the first stopper 223 of the stand member 220 meets the engaging stopper 2123 of the second plate 212.

As described above, an electronic device according to an embodiment includes a stand member to be opened/closed through a hinge structure formed at the upper portion thereof. The upper-positioned hinge structure facilitates a user's convenient manipulation, and also allows efficient arrangement of internal components of the electronic device. In addition, because most of internal components are arranged in the upper region, the electronic device has a gradually decreasing thickness from top to bottom. Therefore, even when the electronic device is laid on a horizontal surface, such as a table, with the stand member completely folded, the display of the electronic device is tilted toward the user at a certain angle. This improves convenience in use of the electronic device.

According to an embodiment, an electronic device includes a housing including a first plate facing in a first direction, a second plate facing in a second direction opposite to the first direction, and a lateral member surrounding a space between the first plate and the second plate. The electronic device may further include at least one hinge structure disposed near one edge of the second plate, a stand member disposed to be opened or closed at a predetermined angle from the second plate through the hinge structure, and a display disposed in the space to be visible outwardly through at least a portion of the first plate. The second plate may include an engaging stopper formed by a terminating plane thereof near the hinge structure, and the stand member may include a first stopper formed by a terminating plane thereof to face the engaging stopper of the second plate. The predetermined angle may be determined when the first stopper meets the engaging stopper.

The first plate may include an extended portion disposed near the hinge structure.

The extended portion may be formed in a curvilinear shape.

The extended portion may overlap with at least a portion of the stand member.

When the stand member is rotated, the at least a portion of the stand member may be in a surface contact with the extended portion.

The stand member may include, at an outer upper portion thereof, a second stopper formed to be stepped lower than a peripheral region, and the predetermined angle may be determined when the extended portion is stopped by contact between the first stopper and the extended portion.

The housing may be formed to have a tapered shape that indicates a gradually decreasing thickness as being away from the extended portion.

The tapered shape may be determined by a structural shape of the second plate and/or the lateral member.

The electronic device may further include one or more electronic components disposed near the extended portion in the space.

The one or more electronic components may include at least one antenna, a printed circuit board, a battery, at least one speaker module, at least one key input device, a microphone device, a camera device, a sensor device, at least one sub-board, and/or at least one electrical connector.

At least one of the one or more electronic components may be exposed, at least in part, through the extended portion.

The at least one key input device and/or the microphone may be exposed, at least in part, through the extended portion.

The electronic device may further include a support member disposed on the second plate in the space near the extended plate and accommodating the at least one hinge structure.

The electronic device may further include at least one antenna disposed in the support member to form a radiation coverage at least through the extended portion.

The at least one antenna may include at least one conductive pattern disposed in the support member.

The at least one conductive pattern may be formed by an LDS process in the support member or included in a FPCB attached to the support member.

The electronic device may further include a printed circuit board including at least one conductive contact and disposed on the first plate in the space. When the first and second plates are assembled with each other, the at least one antenna may be electrically connected to the at least one conductive contact.

The electronic device may further include at least one magnet disposed in the space of the housing, and at least one metal member disposed to react to a magnetic force of the at least one magnet at a corresponding position of the stand member. The stand member may be maintained in a folded state with the housing through the metal member reacting to the magnetic force of the magnet.

The electronic device may include a tablet PC in which the display has a landscape structure indicating a greater length in a horizontal direction than in a vertical direction.

The stand member may include at least one handle opening formed therein to assist an easy carry of the electronic device.

While the disclosure has been particularly shown and described with reference to certain embodiments thereof, it will be understood by those skilled in the art that various changes in form and details may be made therein without departing from the scope of the subject matter as defined by the appended claims and any equivalents thereof.

What is claimed is:

1. An electronic device, comprising:
a housing;
at least one hinge structure disposed to the housing; and
a stand member that is opened or closed at an angle from the housing through the at least one hinge structure,
wherein the housing includes an engaging stopper formed at an outer surface of the housing,
wherein the stand member includes a first stopper formed at a corresponding position of the engaging stopper, and
wherein the angle is determined when the first stopper meets the engaging stopper.

2. The electronic device of claim 1, wherein the housing comprises:
a first plate facing in a first direction;
a second plate facing in a second direction opposite to the first direction; and
a lateral member surrounding a space between the first plate and the second plate,
wherein the first plate includes an extended portion extending from an upper end of the first plate to the second plate.

3. The electronic device of claim 2, further comprising a support member disposed near the extended portion in the space and accommodating the at least one hinge structure.

4. The electronic device of claim 3, further comprising at least one antenna disposed in the support member.

5. The electronic device of claim 4, wherein the at least one antenna forms a radiation coverage in a direction that the extended portion faces.

6. The electronic device of claim 4, wherein the at least one antenna includes a laser direct structuring (LDS) pattern and/or a flexible printed circuit board (FPCB) attached to the support member.

7. The electronic device of claim 4, further comprising a printed circuit board including at least one conductive contact and disposed on the first plate in the space,
wherein when the first and second plates are assembled, the at least one antenna is electrically connected to the at least one conductive contact.

8. The electronic device of claim 2, further comprising one or more electronic components disposed near the extended portion in the space.

9. The electronic device of claim 8, wherein at least one of the one or more electronic components is exposed, at least in part, through the extended portion.

10. The electronic device of claim 8, wherein the one or more electronic components include at least one of an antenna, a printed circuit board, a battery, at least one speaker module, at least one key input device, a microphone device, a camera device, a sensor device, at least one sub-board, and at least one electrical connector.

11. The electronic device of claim 2, wherein the extended portion is formed in a curvilinear shape.

12. The electronic device of claim 2, wherein the extended portion overlaps with at least a portion of the stand member.

13. The electronic device of claim 2, wherein when the stand member is rotated, the at least a portion of the stand member contacts the extended portion.

14. The electronic device of claim 13, further comprising a second stopper formed to be stepped lower than a peripheral region of the stand member,
wherein when the stand member is opened at the angle, a tip of the extended portion meets the second stopper.

15. The electronic device of claim 2, wherein the housing is formed to have a tapered shape that indicates a gradually decreasing thickness as being away from the extended portion.

16. The electronic device of claim 2, further comprising a display disposed in the space and being visible through at least a portion of the first plate.

17. The electronic device of claim 16, further comprising a reinforcing member disposed in the space of the housing,
wherein the display is disposed between the first plate and the reinforcing member.

18. The electronic device of claim 1, further comprising:
at least one magnet disposed in the housing; and
at least one metal member that reacts to a magnetic force of the magnet and is disposed at a corresponding position of the stand member,
wherein the stand member is maintained in a folded state with the housing by the metal member reacting to the magnetic force of the magnet.

19. The electronic device of claim 1, wherein the engaging stopper is formed by a first terminating plane near the at least one hinge structure, and
wherein the first stopper is formed by a second terminating plane corresponding to the engaging stopper.

20. The electronic device of claim 1, wherein the stand member further includes at least one opening formed therein for carrying the electronic device.

* * * * *